July 9, 1946.  S. M. MARTIN  2,403,815

METHOD OF MAKING CORDS

Filed June 16, 1944

INVENTOR
S.M. MARTIN
BY
ATTORNEY

Patented July 9, 1946

2,403,815

UNITED STATES PATENT OFFICE 2,403,815

METHOD OF MAKING CORDS

Samuel M. Martin, Baltimore, Md., assignor to Western Electric Company, Incorporated, New York, N. Y., a corporation of New York Application June 16, 1944, Serial No. 540,694

2 Claims. (Cl. 154—2.22)

This invention relates to cords and methods of making cords.

In the manufacture of Y-type cords by methods heretofore known, it has been necessary to make several splices of conductors and insulate the splices. Such splicing and insulating steps are time-consuming and costly. Furthermore, such splices are possible sources of trouble when such cords are used.

An object of the invention is to provide new and improved cords and methods of making cords.

A method embodying the invention comprises slitting the insulation at one end of a two-conductor, rubber-insulated cord to form a Y, bending a single conductor into the shape of a V, positioning the single conductor with the apex of the V adjacent to the crotch of the Y and the arms of the V parallel to the arms of the Y, forming a body of insulating material around the crotch of the Y and the apex of the V to secure the members in position.

A complete understanding of the invention may be obtained from the following detailed description of a specific embodiment thereof, when read in conjunction with the appended drawing, in which.

Figure 1:
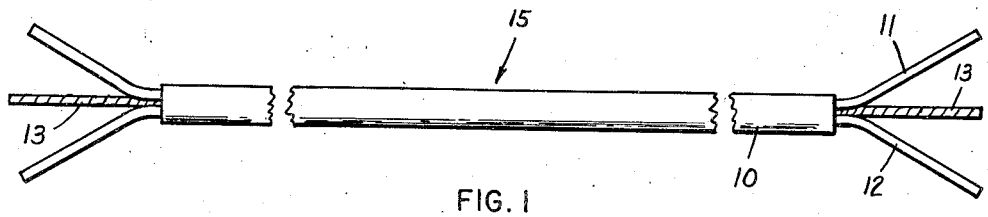
Fig. 1 is a fragmentary plan view of a cord from which a Y-type cord is made in accordance with the present invention.
Figure 5:
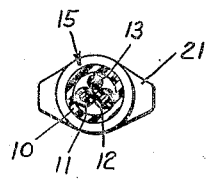
Fig. 5 is a sectional view of the cord taken along line 5—5 of Fig. 4.

In accordance with one method embodying the invention, a portion of the rubber jacket 10 (Fig. 5), which encloses a pair of individually insulated conductors 11 and 12 and a stay cord 13 to form a cord 15, is removed from one end of the cord 15 to bare the ends of the individually insulated conductors and the stay cord. The right hand end of the stay cord 13, as viewed in Fig. 1, then is cut off so that a Y, as shown in Fig. 2, is formed.

Figure 2:
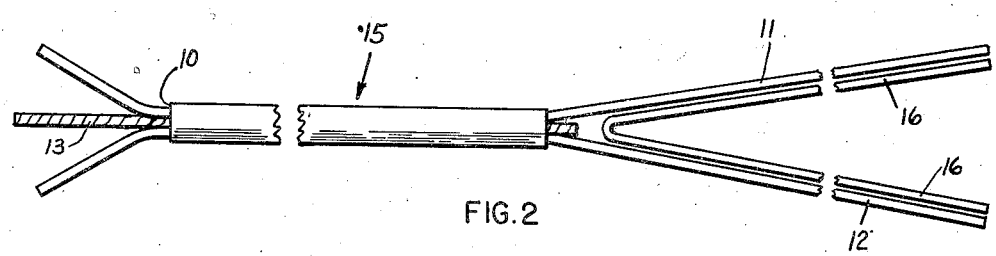
Fig. 2 is a fragmentary plan view of the cord during one stage of its manufacture.
Figure 3:
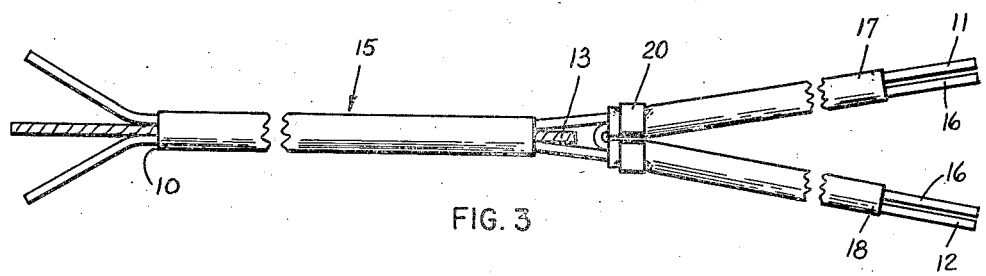
Fig. 3 is a fragmentary plan view of the cord at a more advanced stage of its manufacture.

A single insulated conductor 16 then is bent into the form of a V and is placed adjacent to the cord 15 with the apex of the V adjacent to the crotch of the Y and with the arms of the V positioned in parallel relationship to the uncovered ends of the conductors 11 and 12, as shown in Fig. 2. A rubber tube 17 (Fig. 3) is then drawn over the adjacent ends of the conductors 11 and 16 and a similar rubber tube 18 is drawn over the adjacent ends of the conductors 12 and 16. A metallic band 20 then is placed over the ends of the tubes 17 and 18 to clamp them firmly together.

Figure 4:
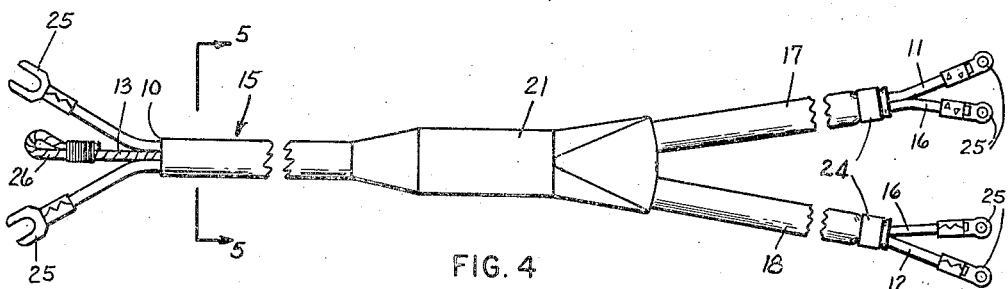
Fig. 4 is a fragmentary plan view of a Y-type cord embodying the invention.

A mass of unvulcanized rubber then is placed around the crotch of the Y and is molded and vulcanized in a molding press (not shown) of conventional design to form a body 21 (Fig. 4) which secures the tubes 17 and 18 to the rubber jacket 10.

A plurality of metallic bands 24—24 are placed on the ends of the tubes 17 and 18. The bands press the tubes into close contact with the conductors 11, 12 and 16 and prevent the conductors from being spread apart.

A plurality of tips 25—25 then may be attached to the ends of the conductors 11, 12 and 16 and the end of the stay cord 13 secured in a loop 26 by any means well known to the art to complete the Y-type cord.

Y-type cords may be made quickly in accordance with present invention and the making thereof involves very little time and expense. Y-type cords embodying the invention have three continuous conductors in each cord rather than spliced conductors and are uniformly high in quality.

What is claimed is:

1. The method of forming a Y-type insulated cord from a cord having a rubber jacket enclosing an end portion of each of a pair of individually insulated conductors and a stay cord, said enclosed portion of the cord forming a stem of a Y and the other portions of the conductors forming the arms of the Y, which comprises bending a third individually insulated conductor into the shape of a V with the end portions of the conductor forming the arms of the V, placing the arms of the V parallel to the arms of a Y formed by such a cord, placing a preformed tube of insulating material over an arm of the Y and the arm of the V adjacent thereto, placing a second preformed tube of insulating material over the other arm of the Y and the arm of the V adjacent thereto, and covering the crotch of the cord thus formed with an insulating material whereby the arms and the stem of the cord are secured together.

2. The method of forming Y-type, rubber-insulated cords, which comprises removing a covering of rubber composition from one end of a two-conductor, rubber-insulated cord to form a Y from the uncovered ends of the two conductors and the covered portion of the cord, bending a third insulated single conductor into the shape of a V, placing portions of the third conductor adjacent to the apex of the V in positions in which said portions are parallel with the uncovered ends of the two conductors, sliding a rubber tube over one end of the third conductor and the end of one of the first-mentioned conductors parallel thereto, sliding a rubber tube over the other end of the third conductor and the end of the other of the first-mentioned conductors, securing the tubes together at the apex of the V, and molding a body of rubber around the crotch of the Y.

SAMUEL M. MARTIN.